(12) United States Patent
Kwon et al.

(10) Patent No.: US 8,079,122 B2
(45) Date of Patent: Dec. 20, 2011

(54) SPACER JIG FOR REPLACING SPACER DAMPER OF OVERHEAD POWER LINES AND METHOD OF REPLACING SPACER DAMPER USING THE SAME

(75) Inventors: Sae Won Kwon, Goesan-Gun (KR); Gap Young Cheong, Seoul (KR); Hyuek Gi Lee, Bucheon-Shi (KR)

(73) Assignee: Daewon Electric Co. Ltd., Gyosung-Ri, Jinchun-Eup, Jinchun-Gun, Choongchungbuk-Do (KR)

( * ) Notice: Subject to any disclaimer, the term of this patent is extended or adjusted under 35 U.S.C. 154(b) by 936 days.

(21) Appl. No.: 12/071,613

(22) Filed: Feb. 25, 2008

(65) Prior Publication Data

US 2009/0000100 A1    Jan. 1, 2009

(30) Foreign Application Priority Data

Jun. 28, 2007    (KR) .................. 10-2007-0064246

(51) Int. Cl.
*H02G 7/12* (2006.01)
(52) U.S. Cl. ..................................... 29/242; 29/402.08
(58) Field of Classification Search .................. 269/45, 269/71, 104, 900; 29/242, 283, 402.01–402.08, 29/729
See application file for complete search history.

(56) References Cited

U.S. PATENT DOCUMENTS

| | | | | | |
|---|---|---|---|---|---|
| 3,080,162 | A | * | 3/1963 | Smith | 269/251 |
| 4,113,979 | A | * | 9/1978 | Torr et al. | 174/42 |
| 4,188,502 | A | * | 2/1980 | Gagne | 174/42 |
| 4,242,537 | A | * | 12/1980 | Hearnshaw | 174/42 |
| 4,381,422 | A | * | 4/1983 | Traini | 174/42 |
| 4,384,166 | A | * | 5/1983 | Nigol et al. | 174/42 |
| 4,554,403 | A | * | 11/1985 | Hearnshaw | 174/42 |
| 5,371,320 | A | * | 12/1994 | Torok et al. | 174/42 |
| 7,673,860 | B2 | * | 3/2010 | Ben-Gigi | 269/41 |
| 2008/0173462 | A1 | * | 7/2008 | Whapham et al. | 174/42 |

* cited by examiner

*Primary Examiner* — Derris Banks
*Assistant Examiner* — Kaying Kue
(74) *Attorney, Agent, or Firm* — GWiPS

(57) ABSTRACT

A spacer jig using as a tool has developed for easily replacing the spacer dampers on the overhead power lines during the maintenance and repair. The spacer jig is comprised of: a frame having a polygonal shape of two flat panels in parallel with a clearance for mounting the fixtures arranged even intervals in the radial direction between the two flat panels; the frame having square shape using for four-conductor and hexagonal shape using for six-conductor overhead power lines; the fixtures consisting of stationary hexahedron nuts and rotational hexahedron nuts; a clamping arm forming cylindrical-shaped long shafts with threaded end portion for inserting into the fixtures; a cable gripping unit consisting of a clamp, lid, snapping latch and locking detent for easily opening and closing the lid to grip or release the cables, and a clamp mounting unit for rotationally mounting the cable gripping unit on top of the clamping arm.

9 Claims, 6 Drawing Sheets

SPACER JIG FOR REPLACING SPACER DAMPER OF OVERHEAD POWER LINES AND METHOD OF REPLACING SPACER DAMPER USING THE SAME

BACKGROUND OF THE INVENTION

1. Field of the Invention

The present invention relates to a spacer jig for replacing the spacer damper, which is installed on a four-conductor or six-conductor system, which are formed a set of power cables, and a method for replacing the spacer damper by setting the spacer jig. More particularly, the spacer jig is used as a tool to replace a damaged or bad spacer damper with a new one during the maintenance of the overhead power lines for reducing the vibration problems.

2. Description of the Related Art

In the conventional method of replacing the spacer damper, the worker travels high in the air with a new replacement spacer damper and installs it by temporarily assembling four conductors at a point 1 to 1.5 m away and six conductors about three m away from the spacer damper to be replaced, and then pushes this in close to the spacer damper.

This process has a problem of taking a long time since it is difficult to separate the spacer damper and replace it with a new one because the surface of the cable is damaged and a high tensile force is on the cable when the worker pushes in the spacer damper.

In order to replace the existing damaged spacer damper, the worker is lifted high in the air with a new spacer damper, and temporarily assembles the new spacer damper at a location about one to three m away from the existing spacer damper. The existing spacer damper cannot be approached closely enough to be replaced and the worker cannot hold up or widen the relevant cables by hand because of the high tensile force of the cable.

Because of that, the worker holds up the relevant cable by hand at a location where a certain degree of modification is possible, that is, a location separated by a given distance from the damaged spacer damper, before he temporarily assembles the new spacer damper.

The new spacer damper assembled temporarily like this should now be moved to the location of the existing spacer damper which is to be replaced. Since the location of the existing spacer damper was initially set up at the most suitable and efficient location with respect to the total length of overhead line, it is most preferable to install the new damper at the same location. Therefore, the new spacer damper is moved to and installed in the place where the existing spacer damper is located.

Considerable scratching can occur on the surface of the cable in the course of sliding the temporary spacer damper assembly as described above. It is also very difficult and dangerous for the worker high up in the air to push the spacer damper by hand for installation.

Moreover, the course of replacing one spacer damper in the cables consumes a lot of time, which gives rise to the problems of increased worker fatigue, decreased work effort and much lowered safety.

Especially for hot-line work of transmission lines, work safety decreases as working time increases, so it can be said that spacer damper replacement work using a spacer jig is a required process for hot-line work.

SUMMARY OF THE INVENTION

It is an object of the present invention to provide a method for replacing a spacer damper by adjusting the spacing of four-conductor and six-conductor cables so as to easily replace the old spacer damper installed in the span of four-conductor and six-conductor system of overhead power lines; and a spacer jig using as a tool for replacing the spacer damper by easily widening the space between four-conductor and six-conductor cables by providing movable clamp shafts that are radially adjusted to vary the space between the cables.

It is another object of the present invention to provide a spacer jig for replacing the spacer damper and a method of replacing the spacer damper by using the spacer jig, where a hexagonal bolt head is mounted at the end of each clamp shaft, so that a worker can easily adjust the spacing of the cables. The length of the clamp shaft can be adjusted by using a wrench, and a rotating mount plate is provided between the clamp shaft and the clamp, so the clamp and cable are not twisted when the clamp shaft is rotated by the wrench. A snap locking lid is mounted on the edge of the clamp to grip the cable, so that the work is conveniently performed to quickly adjust the spacing of cables.

In accordance with the present invention, a spacer jig is provided for replacing the spacer damper. The spacer jig has a structure comprising: a clamp provided with snap locking lid; a clamp shaft provided with a male thread; a clamp mounting unit for coupling the clamp shaft and the clamp; a stationary hexahedron nut with a female threaded is provided to mate with a male thread of the clamp shaft; a rotational hexahedron nut has a pair of disk shaped hinges protruded from front and rear surface to mount into a hinge hole on the frame so that the rotational hexahedron nut can be rotated; a grip ring installed at the end of the clamp shaft to be turned by hand; a hexagonal bolt head formed at the end of the clamp shaft for turning by wrench; and a frame has polygonal shape for mounting four or six clamp shafts. To replace a spacer damper by using the spacer jig is described that, the spacer jig is installed at the vicinity location of the bad spacer damper, and then the bad spacer damper is removed and the new spacer damper is installed.

Preferably, the clamp comprises: the clamp and the lid grip the cables on the overhead power lines by snap locking latch; and a clamp mounting unit for coupling the clamp and the clamp shaft by the rotating plate, so as to prevent the clamp and cables twisted from rotating of the clamp shaft. Preferably, the clamp shaft comprises: a male thread; a grip ring for rotating by hand; and a hexagonal bolt head integrally formed at the tip for turning by a wrench.

Preferably, the stationary and rotational hexahedron nuts are arranged even interval in radial direction of the frame. A square shaped frame has three stationary hexahedron nuts and one rotational hexahedron nut for the four-conductor spacer jig. A hexagonal shaped frame has four stationary hexahedron nuts and two rotational hexahedron nuts for the six-conductor spacer jig, respectively.

Preferably, a method for replacing a new spacer damper by using the spacer jig of the present invention comprising the steps of: first install the spacer jig adjacent to the bad spacer damper, turning the clamp shaft of spacer jig to widen the spacing, then release the bad spacer damper from the cable, and remove the bad spacer damper from the four conductor or six conductor cables.

Next, put a new spacer damper on the four-conductor or six-conductor cables, resuming the spacing between cables back to normal by turning the clamp shaft of spacer jig, open the clamp of spacer damper, and release the spacer jig.

BRIEF DESCRIPTION OF THE DRAWINGS

FIG. 7A is a perspective view of an existing spacer damper installed on line.

FIG. 7B is a perspective view showing the state where a spacer jig is installed in the location adjacent to the existing spacer damper.

FIG. 7C is a perspective view showing the process of separating the existing spacer damper by expanding the clamp shafts of the spacer jig.

DETAILED DESCRIPTION OF THE PREFERRED EMBODIMENT

Hereinafter, a spacer jig using as a tool for replacing the spacer damper of the present invention will be described in detail accompanying with the drawings.

Figure 1:
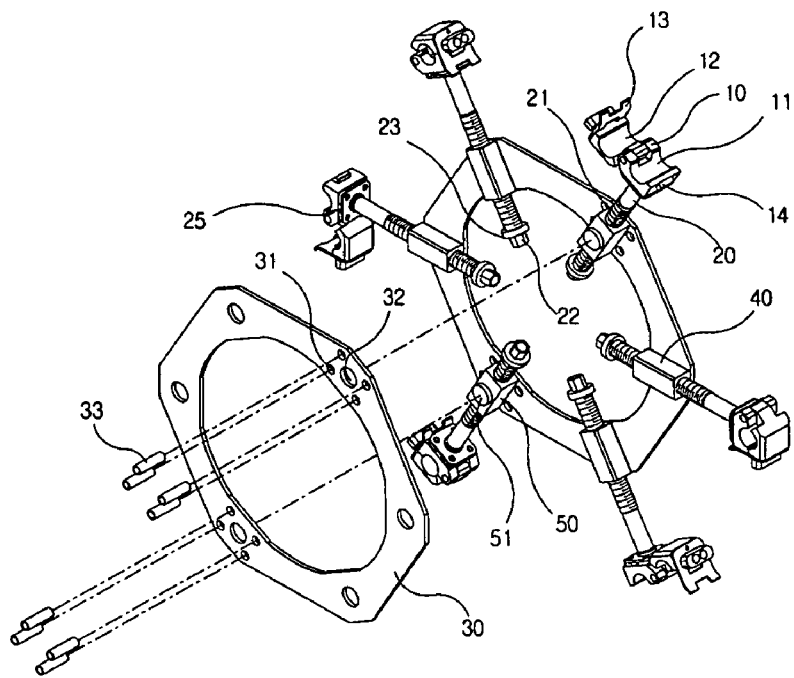
FIG. 1 is a perspective view showing the disassembled state of a spacer jig for six conductors of the present invention.
Figure 2:
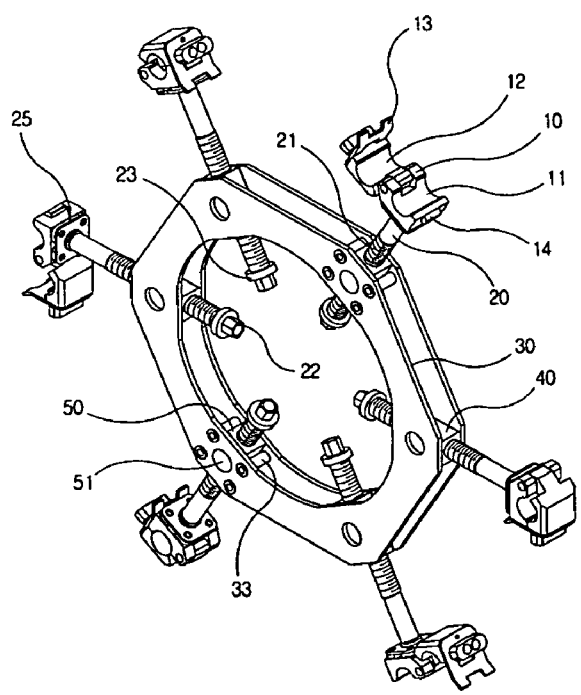
FIG. 2 is a perspective view showing the assembled state of the spacer jig according to the present invention.
Figure 3:
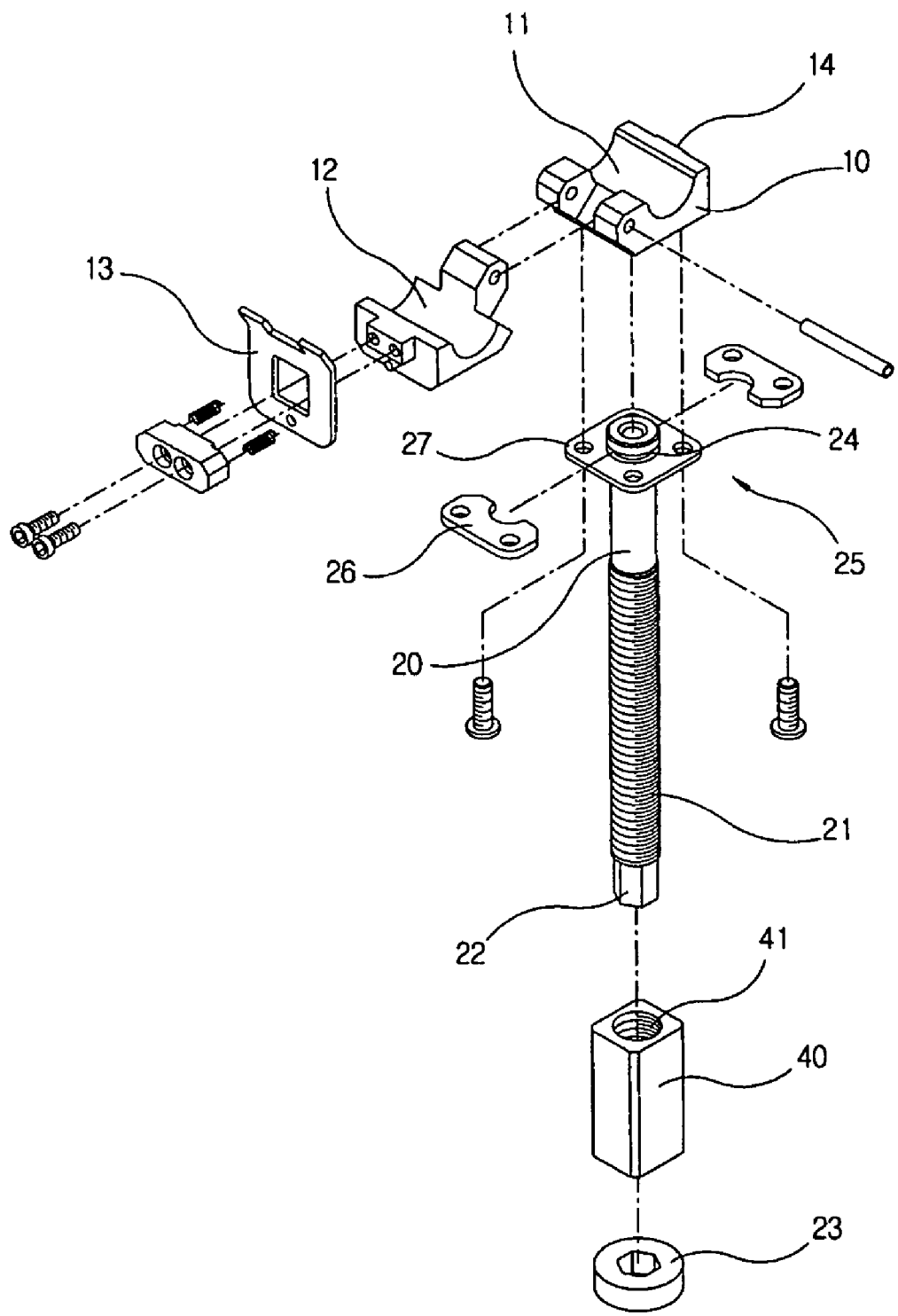
FIG. 3 is a disassembled perspective view of the clamp shaft and clamp of the spacer jig according to the present invention.
Figure 4:
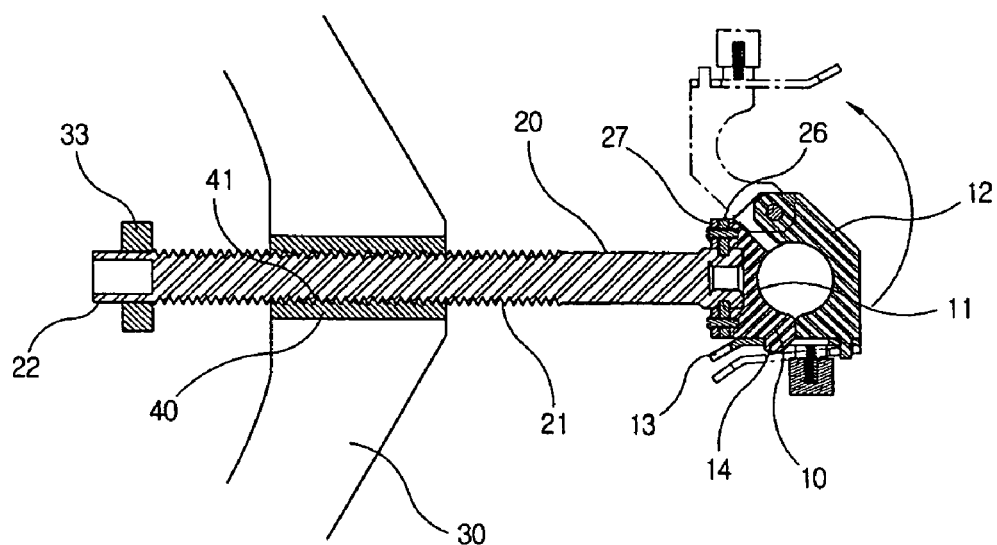
FIG. 4 is a sectional view showing the assembled state of the clamp and clamp shaft of the spacer jig according to the present invention.
Figure 5:
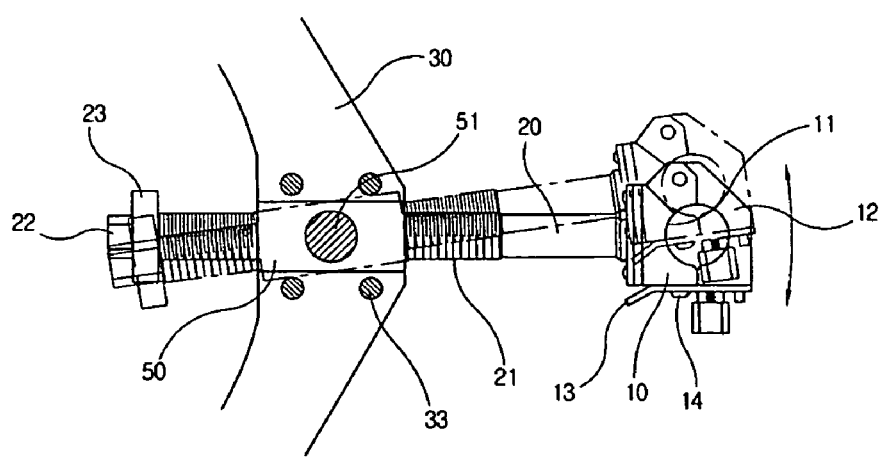
FIG. 5 is an operating diagram showing the rotating state of the clamp shaft of the spacer jig according to the present invention.
Figure 6:
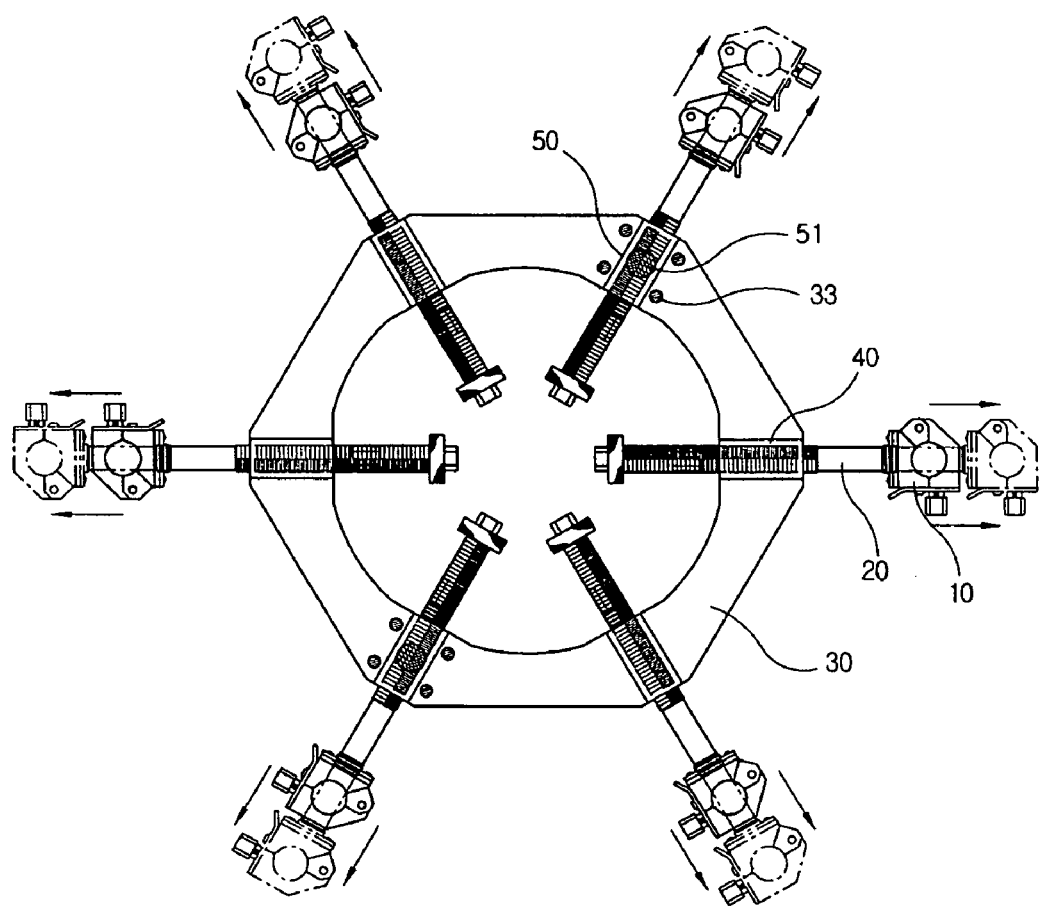
FIG. 6 is an operating diagram showing the expanded state of the clamp shaft of the spacer jig according to the present invention.

FIG. 1 is a perspective view showing the disassembled state of a spacer jig for six conductors according to a preferred embodiment of the present invention. FIG. 2 is a perspective view showing the assembled state of the spacer jig according to the present invention. FIG. 3 is a disassembled perspective view of the clamp shaft and clamp of the spacer jig according to the present invention. FIG. 4 is a sectional view showing the assembled state of the clamp and clamp shaft of the spacer jig according to the present invention. FIG. 5 is an operating diagram showing the rotating state of the clamp shaft of the spacer jig according to the present invention, and FIG. 6 is an operating diagram showing the expanded state of the clamp shaft of the spacer jig according to the present invention.

Referring to these drawings, a spacer jig according to the preferred embodiment of the present invention is comprised of: a frame having a polygonal shape of two flat panels in parallel with a clearance for mounting a set of fixtures arranged even intervals in radial direction between the two flat panels (30), a set of the fixtures consisting of stationary hexahedron nuts (40) and rotational hexahedron nuts (50) mounted between the two flat panels (30), a set of clamp shafts (20) forming cylindrical-shaped long shafts with threaded end portion for inserting into the fixtures, a cable gripping unit consisting of a clamp (10), lid (12), snapping latch (13) and locking detent (14) for easily opening and closing the lid (12), and a clamp mounting unit (25) for rotationally mounting the cable gripping unit on top of the clamp shafts (20).

The clamp 10 is snap locking to the locking detent 14 for gripping and supporting the cables and is provided with a cable seating surface 11, the lid 12 for gripping the cable after inserting it, and the snapping latch 13 attached at one side of the lid 12. The lid 12 is mounted at one end of the clamp so as to rotate with respect to a hinge pin, to provide a cable seating surface 11. After the cable is seated on the clamp 10, the lid 12 is closed, and the snapping latch 13 is simultaneously caught by the locking detent 14 to hold the cable.

The clamp shaft 20 has formed a male thread 21 on the outer circumference thereof to extend or retract its length in radial direction of the frame. A grip ring 23 is mounted on a hexagonal bolt head 22 formed at one end of the clamp shaft 20, so that it is easy to turn the clamp shaft 20 by wrench when it is loaded, or by gripping and turning the grip ring 23 by hand if it is not loaded.

The clamp mounting unit 25 located between the clamp 10 and the clamp shaft 20 is rotated to keep the cable in proper orientation without twisting while the clamp 10 is gripping the cables. The clamp mounting unit 25 is consisted of a circumferential groove (24) integrally formed at top end of the clamp shafts (20), a retainer (26) formed a semi-circular cutout at its center and divided to two pieces for laterally engaging to the groove (24), a mounting plate (27) having four bolt holes at each corner, and four fasteners for securing and fixing the retainers (26) and mounting plate (27) together to the bottom of the clamp (10). One end of the clamp shaft 20 is contacted to the bottom of the clamp 10, two pieces of left and right retainers 26 are inserted into the circumferential groove 24 of the clamp shaft 20, and attaching the mounting plate 27 over the retainers 26, then installing the mounting plate 27 and the retainers 26 together to the bottom of the clamp 10 by fastening a plurality of bolts. Since the retainers 26 are inserted into the circumferential groove 24 of the clamp shaft 20, the clamp 10 is freely rotated with respect to an axis of the clamp shaft 20.

The frame, which has a plurality of the hexahedron nuts (40, 50) and rotatably inserted the clamp shafts 20, has a hexagonal shape for six-conductor and a square shape for four-conductors to match the numbers of the conductors on the overhead power lines. The frame for six-conductor has a pair of the rotational hexahedron nut (50) in the diagonal direction. The frame for four-conductor has at least one rotational hexahedron nut (50).

The stationary hexahedron nuts (40) are welded directly to both front and rear panels 30 of the frame. The hexahedron nut has formed a female thread 41 its inner circumference. The male thread 21 of the clamp shaft 20 has same pitch to mate the female thread 41 of the hexahedron nuts.

The rotational hexahedron nut (50) has integrally formed the disk-shaped hinges (51) protruded on front and rear surfaces to mate with circular hinge holes (32) formed on the frame. When the disk-shaped hinges 51 protruded from the rotational hexahedron nut 50 are assembled to the hinge hole 32 on both panels of the frame, the rotational hexahedron nut 50 can be rotated with respect to the axis of the disk-shaped hinges (51). The stationary hexahedron nuts (40) has also formed a female thread its inner surface same pitch of the rotational hexahedron nut 50. When the clamp shaft 20 rotates with respect to its axis, the clamp shaft 20 will be traveled along the radial direction of the frame.

There are four bolt holes 31 formed on the front and rear panels of the frame to install the four support bushings 33 around the rotational hexahedron nut (50). Next, the bolts are inserted into the bolt holes 31 from both front and rear panels of the frame to fasten four support bushings 33. Then, the rotational hexahedron nut (50) surrounded by the support bushings 33 is limited its rotation from left or right in the range of ±10°.

Through the rotation of the clamp shaft 20, the spacer jig can be adjusted the space of the cables for the overhead power lines to easily replace the spacer damper. Even if the cables on the overhead power lines are not properly or uniformly arranged space, it is possible to effectively use the present spacer jig in all situations.

Therefore, a worker can easily replace the spacer dampers by using the spacer jig to widen or resume the cable spacing of four-conductor or six-conductor of the overhead power lines.

Figure 7A:
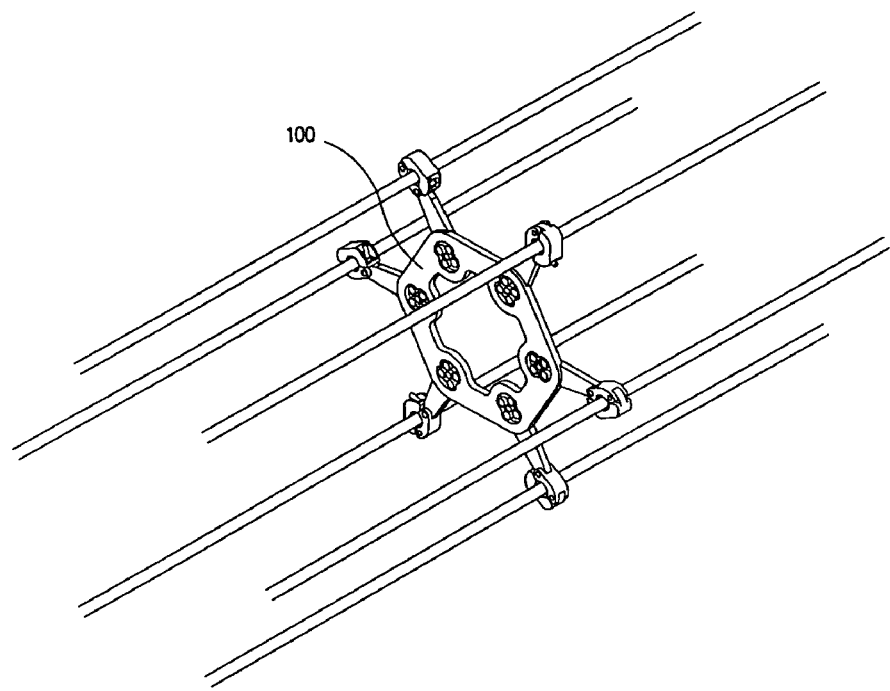
FIGS. 7A to 7C are drawings showing the process of replacing spacer dampers using the spacer jig of the present invention.
Figure 7B:
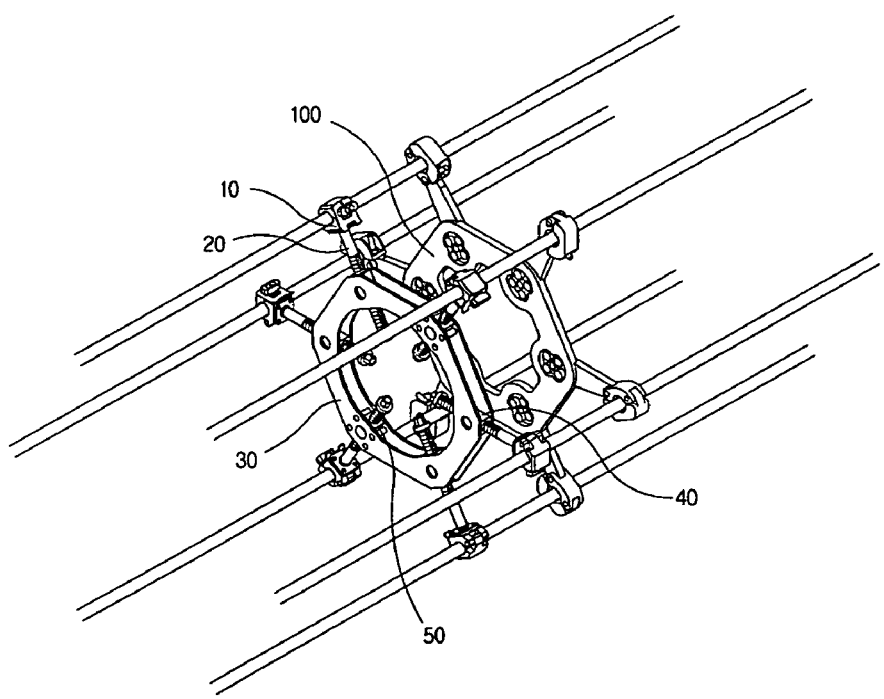

Namely, to replace a damaged spacer damper 100 as shown in FIG. 7A, install the spacer jig of the present invention on one side of the existing spacer damper 100 as shown in FIG. 7B. Next, insert each of the cables into one of the clamps 10 mounted at the end of the clamp shaft 20 of the spacer jig, and then close the cover 12 to combine said clamps 10 with the cables in sequence. When closure of all the clamps 10 is completed, rotate these clamp shafts 20 in sequence to move the clamp shafts 20 radially outward. As the clamp shafts 20 move outward along the radius of the frame 30, the spacing between the cables gripped by the clamps 10 is expanded.

Figure 7C:
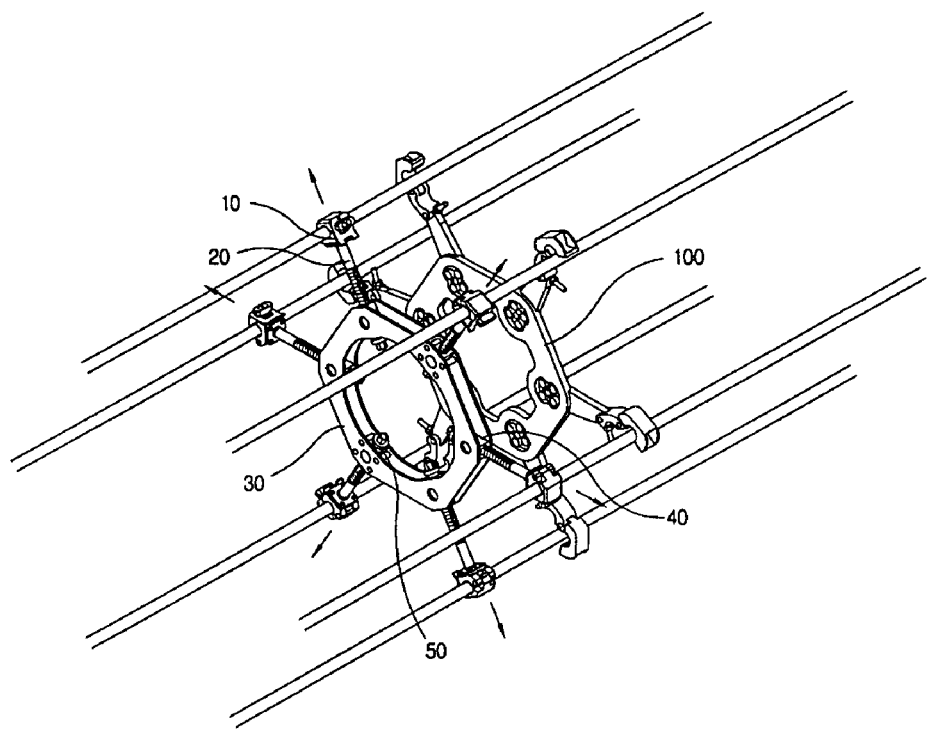

Therefore, as shown in FIG. 7C, with the connection between the damper and cable released by releasing the clamped state of the clamping means of the existing spacer damper 100, rotate the clamp shafts of the spacer jig with the relevant cables gripped to protrude them outward, and then the relevant cables are widened all together. Thus, it is possible to separate and easily remove the existing spacer damper 100 from the cables.

In addition, with the existing spacer dampers completely removed by repeating this process, locate new spacer dampers in the same positions and rotate the clamp shafts that are clamping the cables in the reverse direction to move them inward radially, and then the relevant cables are arranged in the cable arrangement portion formed in the end portion of the spacer damper. After this, it is possible to install new spacer dampers easily on the cables on overhead line by these clamping means.

Therefore, according to the spacer jig and the method of replacing spacer dampers using it, the process is easy and convenient, so even in the case that cable spacing cannot be adjusted manually by the worker because there is a high tensile force on the cable, it is possible to adjust cable spacing easily and freely by using the spacer jig. It is very easy to release and install spacer dampers, and especially because replacement work time is considerably shortened, it is very useful for hot-line work on transmission lines.

Figure 8:
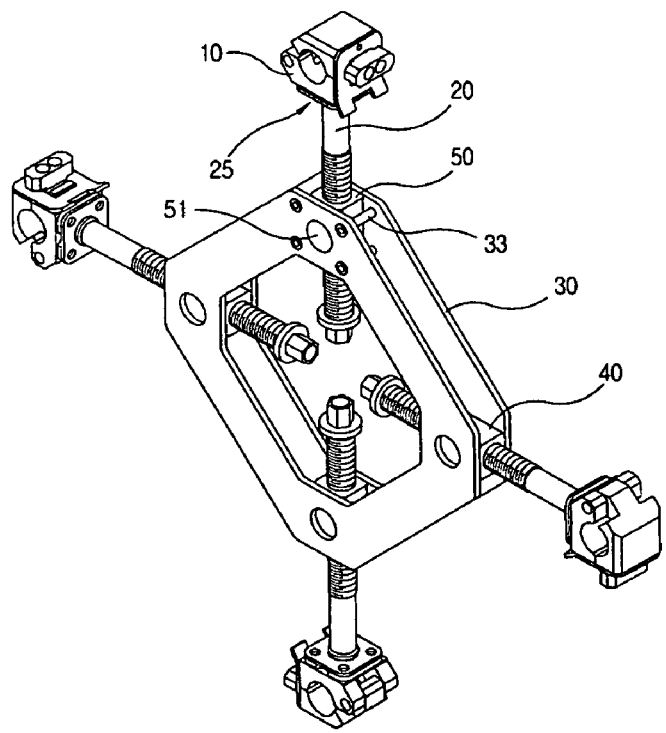
FIG. 8 is an overall perspective view of the spacer jig for four conductors according to another embodiment.

In another embodiment of the present invention shown in FIG. 8, the above-described frame is formed in a square-shaped panel, and a number of stationary hexahedron nuts 40 and at least one rotational hexahedron nut 50 are mounted in the corner portions, and four clamp shafts 20 are threaded to these hexahedron nuts. In this embodiment, it is possible to conveniently replace spacer dampers by using the spacer jig on the four conductors of the overhead power lines.

Another embodiment of the present invention is a method for replacing a space damper on overhead power lines by using a spacer jig as a tool. The method is comprised the steps of: a spacer jig is installed adjacent to a spacer damper, which is going to replace, after the number of clamp shafts of the spacer jig is checked whether it has the same number of the conductors on the overhead power lines; each cable of the overhead power lines are gripped with each clamp of the spacer jig, and each cable is released from each clamp of the spacer damper; the distance between the cables is widened by gradually rotating the clamp shafts of spacer jig to reach the maximum, then each clamp of the spacer damper is separated from each conductor of the overhead power lines, and the old or damaged spacer damper is removed; a new spacer damper is installed on the overhead power lines, through the reverse sequence of removing the old spacer damper; reversing the clamp shafts of spacer jig to reach the normal distance between the cables; each cable is fastened to each clamp of the new spacer damper by adjusting cable space, and turning the clamp shafts of spacer jig, and the spacer jig is removed by separating the clamps from the cables of the overhead power lines.

According to the present invention, it is possible to replace the existing spacer dampers with new ones easily and quickly after separating them from four conductors or six conductors during spacer damper replacement or maintenance work in dead-wire or hot-line condition of the transmission line. Safe working conditions are provided so that work efficiency is improved and worker's fatigue is greatly reduced.

Although the present invention has been described in detail referent to its presently preferred embodiment, it will be understood by those skilled in the art that various modifications and equivalents can be made without departing from the spirit and scope of the present invention, as set forth in the appended claims.

What is claimed is:

1. A spacer jig using as a tool for replacing a spacer damper on overhead power lines, the spacer jig comprising;
   a frame having a polygonal shape of two flat panels in parallel with a clearance for mounting a set of fixtures arranged even intervals in radial direction between the two flat panels (30),
   a set of said fixtures consisting of stationary hexahedron nuts (40) and rotational hexahedron nuts (50) mounted between the two flat panels (30), wherein said rotational hexahedron nut (50) has integrally formed disk-shaped hinges (51) protruded on front and rear surfaces to mate with circular hinge holes formed on the frame, so that said rotational hexahedron nut (50) can be rotated within a limited angle with respect to an axis of the disk-shaped hinges (51),
   a set of clamp shafts (20) forming long cylindrical-shape with threaded end portion for inserting into the fixtures,
   a cable gripping unit consisting of a clamp (10), lid (12), snapping latch (13) and locking detent (14) for opening and closing the lid (12), and
   a clamp mounting unit (25) for rotationally mounting the cable gripping unit on top of the clamp shafts (20), wherein said clamp mounting unit (25) is consisted of a circumferential groove (24) integrally formed at top end of the clamp shafts (20), a retainer (26) formed a semicircular cutout at its center and divided to two pieces for laterally engaging to the groove (24), a mounting plate (27) having four bolt holes at each corner, and four fasteners for securing and fixing said retainers (26) and mounting plate (27) together to the bottom of the clamp (10).

2. The spacer jig as set forth in claim 1, wherein said frame are formed a square-shape using for four-conductor overhead power lines, having a plurality of the stationary hexahedron nuts (40) and at least one rotational hexahedron nut (50).

3. The spacer jig as set forth in claim 1, wherein said frame are formed a hexagonal shape using for six-conductor overhead power lines, having a plurality of the stationary hexahedron nuts (40) and at least one rotational hexahedron nut (50).

4. The spacer jig as set forth in claim 1, wherein said stationary hexahedron nuts (40) are welded directly to the frame.

5. The spacer jig as set forth in claim 1, further comprising a plurality of support bushings (33) is installed around the rotational hexahedron nut (50), so that the rotating angle is limited between the installed support bushings (33).

6. The spacer jig as set forth in claim 5, wherein said rotational hexahedron nut (50) is limited within about 10° for rotation from left to right.

7. The spacer jig as set forth in claim 1, wherein said clamp shafts (20) has formed a male thread (21) for mating with a female thread of said stationary hexahedron nuts (40) and rotational hexahedron nuts (50).

8. The spacer jig as set forth in claim 1, wherein the clamp (10) is hinged to the lid (12) by a hinge pin, and the snapping latch (13) is engaged to the locking detent (14) integrally formed at edge of the clamp (10) for opening and closing to grasp a round cable.

9. The spacer jig as set forth in claim 1, wherein said clamp shafts (20) has formed a hexagonal bolt head (22) at its other end, and a grip ring (23) engaged to the hexagonal bolt head (22) for rotation.

* * * * *